June 4, 1935. E. S. SMITH, JR 2,003,839
APPARATUS FOR METERING THROUGH THE MEDIUM OF THE VERSED SINE
Filed Aug. 6, 1930 6 Sheets-Sheet 1

Inventor
Ed S. Smith, Jr.
By Thomas A. Jenkes Jr.
Attorney

Inventor
Ed S. Smith, Jr.
By Thomas A. Jenkins Jr.
Attorney

June 4, 1935. E. S. SMITH. JR 2,003,839
APPARATUS FOR METERING THROUGH THE MEDIUM OF THE VERSED SINE
Filed Aug. 6, 1930   6 Sheets-Sheet 6

Inventor
Ed S. Smith, Jr.
By Thomas A. Jenckes Jr.
Attorney

Patented June 4, 1935

2,003,839

UNITED STATES PATENT OFFICE 2,003,839

APPARATUS FOR METERING THROUGH THE MEDIUM OF THE VERSED SINE

Ed S. Smith, Jr., Providence, R. I., assignor to Builders Iron Foundry, Providence, R. I., a corporation of Rhode Island Application August 6, 1930, Serial No. 473,391

19 Claims. (Cl. 73—167)

My invention relates to improvements in apparatus for metering fluid flowing through a conduit. While my invention may be employed for metering any type of fluid it is particularly adapted for metering gases. I believe I am the first to employ the so-called versed sine principle in metering or indicating any quantity which varies as the square root of another quantity.

Mathematicians for years have known that the versed sine, namely one minus the cosine varies substantially in accordance with the square root of the same quantity and others have designed integrators employing charts of even differential spacings and then employed a planimeter type of integrator to integrate directly from readings already made on these existing charts, which planimeters employ the versed sine-square root relationship. I therefore move a pivoted member through an angle the versed sine of which is proportional to the quantity to be indicated whereby the angular position of said pivoted member may indicate substantially the square root of said quantity. I am thus enabled to provide a very simple meter employing a pivoted member which may be moved in any suitable manner by the variable quantity, which may indicate itself or actuate another simple indicating member. Inasmuch as I move this member in the versed sine relation any necessity for a square root cam is entirely eliminated and thus the time necessary to accurately file cams used in former types of meters is saved.

A further object of my invention is to provide a more efficient meter than employed hitherto, a true rate meter and not a differential meter, constructed of a very small number of simple parts.

My invention is particularly adapted for metering the quantity rate of flow of a fluid and in my specific construction a further object of my invention is to construct a meter wherein moderate changes of the density and height of the sealing fluid do not upset its equilibrium.

As stated mathematicians have known that up to approximately fifty degrees the versed sine varies within three percent of the square root. A further object of my invention is to so modify the movement of the movable member that it moves substantially accurately in the true substantially square root relation. In my specific embodiment I correct or modify the movement of the pivoted member by means of a compensating weight mounted thereon to make the angular movement of said member proportionate to the quantity rate, correcting not only the approximation of the versed sine to the square root relationship, but also for movement of the counter displacer and bell relative to the liquid surface.

In a specific application of my invention I also provide apparatus for continuously indicating the product of the square roots of several respective quantities by moving the pivoted members through angles the versed sines of which are proportional to said respective quantities and I automatically multiply the movement of said respective pivoted members together and provide suitable indicating means actuated by said multiplying means for continuously automatically indicating their product. In the specific application of my invention therefore I am enabled to correct the true quantity rate of flow for variations in pressure in the conduit by moving a second supplemental pivoted member through an angle the versed sine of which is proportional to the pressure in the conduit and multiplying the movement of said supplemental pressure pivoted member by the movement of the quantity rate pivoted member to thus correct and indicate the true quantity rate of flow.

A further object of my invention is to provide a meter which may be readily set up, easily cleaned and cared for by an ordinary mechanic, thus eliminating any necessity for skilled high price meter repair men. My preferred type of meter is particularly adapted for use in the natural gas industry where the simplest possible type of meter is desired and where the pressure must be continuously compensated for. The present practice in the natural gas industry is to calculate from charts showing pressure and pressure differentials, at present at fifteen minute intervals during the day in metering natural gas. Elaborate tables of pressure and pressure differential extensions have been prepared and much time on the part of skilled men is employed in calculating through means of these tables the actual quantity rate of flow. Employing my invention which continuously corrects the quantity rate of flow for pressure, the necessity for these skilled men and elaborate tables is eliminated.

A further object of my invention relates to the specific construction of means I employ to secure the versed sine relationship. I employ a pivoted beam capable of tilting through an angle, a quantity variable with respect to time such as a pressure differential exerting a torque on said beam proportionate to said variable and I provide versed sine torque balancing means for said beam comprising one weight exerting an opposing constant torque of unity and a second weight exerting a reinforcing torque which varies as the cosine of the angle formed between the horizontal position of the beam and its angular displacement from the horizontal whereby the net balancing torque of said balancing means is proportional to the square root of said variable inasmuch as the versed sine-square root relationship makes this possible.

These and such other objects of my invention as may hereinafter appear will be best understood from a description of the embodiments thereof shown in the accompanying drawings.

Figure 6:
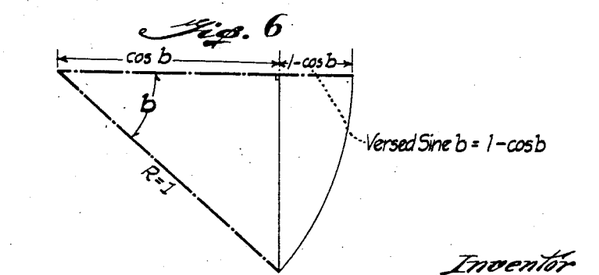
Fig. 6 is a diagrammatic view illustrating the principle of the versed sine relationship in relation to its angle.
Figure 7:
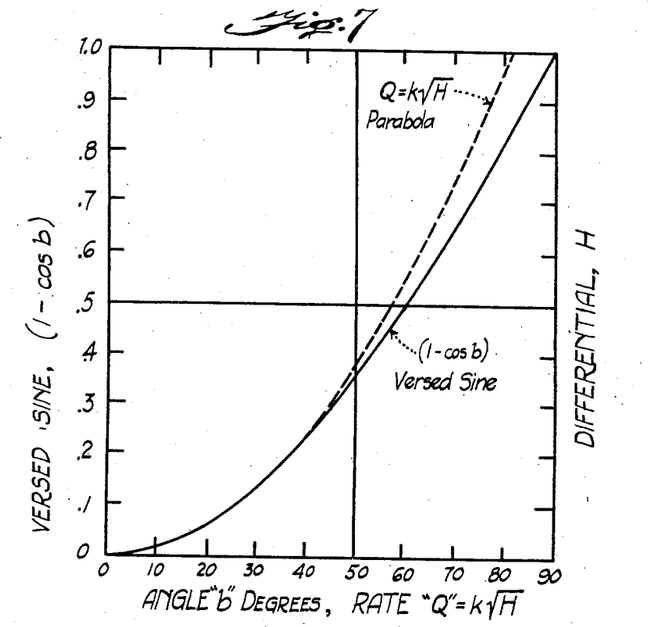
Fig. 7 is a chart plotting the respective versed sine and square root curves showing how they substantially coincide up to fifty degrees.
Figure 8:
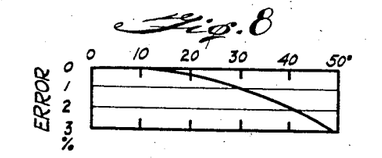
Fig. 8 is an enlarged chart, showing the variation between the versed sine and the square root relationship.

In the drawings, wherein like characters of reference indicate like parts throughout, 15 generally indicates a quantity rate meter particularly adapted for use in metering natural gas adapted to be attached to a conduit to meter the quantity rate of flow of fluid therethrough, also having means therein to modify the quantity rate reading in accordance with changes of pressure in the conduit. In my preferred embodiment I meter the quantity-rate by employing the versed sine relationship by moving a pivoted member through an angle the versed sine of which is proportional to the pressure differential, whereby the angular position of said pivoted member may indicate substantially the square root of said pressure differential and in metering for pressure I move a supplemental pivoted member through an angle the versed sine of which is proportional to the pressure whereby the angular position of said pivoted member may indicate substantially the square root of said pressure and I multiply the movement of said members moving in accordance with the square root of said pressure differential and pressure respectively together to correct the quantity-rate reading for changes in pressure, thus where employing the pressure differential I employ the versed sine relation and I also employ the versed sine relation in correcting for pressure. Figs. 6, 7 and 8 diagrammatically illustrate the versed sine. In all embodiments of my invention I may employ a freely pivoted beam 20, in the embodiment shown in Figs. 1-5 the beam 20, in the embodiment shown in Fig. 9 the beam 20', and in the embodiment shown in Fig. 10 the beam 20''. I act on said beam an amount proportional to a quantity variable with respect to time, such as a pressure differential produced in any suitable manner so that the beam pivots through an angle whose versed sine is proportional to said pressure differential or other variable whereby the said angle of movement of the beam varies continuously as substantially the square root of said quantity.

As stated hitherto, the relationship between the square root and the versed sine has been known by mathematicians for many years but has not so far as I am aware been employed in directly actually metering a quantity variable with respect to time, such as a pressure differential, or to meter the quantity-rate which varies as the square root of the pressure differential. Fig. 6 diagrammatically illustrates the versed sine principle. Where R equals 1, the distance between the foot of the sine and the arc of $b$ is the versed sine. Thus where R equals 1 the versed sine equals 1 minus the cosine of the angle $b$, thus diagrammatically bringing this relationship into the actual structure of my various embodiments. In the embodiment shown in Figs. 1-5 and Fig. 9 the angle $b$ equals the amount that the beam 20 or 20' is pivoted from the horizontal and in the embodiment shown in Fig. 10 the angle $b$ equals the amount that the beam 20'' is pivoted from a true vertical position. Fig. 7 diagrammatically plots the curve of the versed sine (1 minus the cosine of the angle $b$) or the amount that the respective beam 20, 20' or 20'' is moved and the curve of the quantity K times the square root curve and Fig. 8 diagrammatically plots the variations or error between the versed sine and square root relationship showing a remarkable correspondence up to fifty degrees being only about three percent at fifty degrees.

In the embodiments shown in Figs. 1-5 and Fig. 9 as stated I act on the beam 20 by exerting a torque thereon proportional to a quantity variable in respect to time, such as the pressure differential or the pressure. I also employ torque balancing means for the beam 20 comprising a weight 22 exerting an opposing constant torque of unity on said beam and a second weight 24 exerting a reinforcing torque on said beam to counterbalance the beam at zero horizontal position and to exert a reinforcing torque on said beam proportionate to the cosine of the angle $b$, being the angular displacement of said beam from the horizontal, said reinforcing torque thus varying as the cosine of said angle, whereby the net balancing torque is proportional to said variable when said beam is in equilibrium and said angle $b$ is continuously proportional to the square root of said variable, the torque exerted by the variable being thus balanced into one minus the cosine of $b$, or the versed sine of $b$.

Figs. 1-5 illustrate the preferred embodiment of my invention, particularly adapted for metering natural gas, which is subject to frequent pressure variations affecting its quantity-rate of flow.

26 indicates a conduit through which the gaseous fluid is being metered. I provide suitable means 28 in said conduit 26 to produce a pressure differential H responsive to the quantity-rate of flow of gas therethrough. While any suitable type of pressure differential responsive means may be employed I preferably as shown employ the orifice plate 28. As a pressure differential responsive means I employ a casing 30 having sealing liquid 32 therein. I mount an inverted bell 34 in said casing so as to have the lower open end 36 thereof sealed by said liquid 32. I provide means such as the pipes 38 and 40 respectively connected to the high and low pressure sides of said pressure differential producing means 28, one of said pipes being connected to said casing above the level of liquid therein and the other of said pipes being connected to the interior of said floating bell also above the level of the liquid therein, whereby the force on said bell may vary in response to said pressure differential, thus in my preferred embodiment the upstream pipe 38 being connected to said casing 30 above the level of liquid 32 therein and the down stream pipe 40 being connected to the interior of the bell 34 above the level of liquid therein. It is obvious however, that instead of employing a floating bell any other suitable type of differential pressure responsive means may be employed such as that shown in Fig. 9.

In my preferred embodiment shown in Figs. 1–5 the freely pivoted beam comprises the shaft 20 pivotally mounted transversely of said casing 30 above said inverted bell. I mount the two pulleys 42 on said shaft 20 and I provide means such as the flexible cords 44 connecting the top of the bell 34 and said pulleys 42 to cause said pulleys and hence shaft 20 to move in response to changes in said pressure differential. The torque balancing means for said beam 20 includes the weight 22 attached to the pulleys 42 by means of the cords 46 connected to exert an opposing torque of unity on said beam 20, the torque being constant as the force of the weight is always exerted in a downward vertical line on the periphery of the pulley 42 at a constant distance from the center of the shaft 20. I also employ as part of the torque balancing means a second weight 24 mounted on said shaft 20 by means of the levers 48 on the opposite sides of said pulleys 42 from said unity weight 22 exerting a reinforcing torque on said shaft 20 to that of the pressure differential or bell 34, the torque exerted by the second reinforcing weight 24 when said lever is in an horizontal position also being equal to unity and equal to the cosine of the angle b formed by displacement of the lever 48 from the horizontal so that the effective torque due to said weight is equal to unity minus the cosine of said angle (versed sine) as hitherto explained. It is thus obvious that the net balancing torque of said weights is thus proportional to said pressure differential when said beam is in equilibrium and the said angle b is continuously proportional to the square root of said variable due to the versed sine square root relationship hitherto explained.

As also explained hitherto and as shown diagrammatically in Figs. 7 and 8 there is a slight deviation of the versed sine from the square root relationship and I accordingly modify the movement of the pivoted member or beam 20 to cause it to follow the true substantially square root relation between quantity-rate and differential and thus as the quantity-rate varies as the square root of the differential the movement of the member 20 will indicate the true quantity rate of flow. In the preferred embodiment of my invention shown in Figs. 1–5 for this purpose, I provide a compensating weight 50 and mount it on said beam or shaft 20 and I select a weight of such a magnitude as to make the angular movement of said beam or lever proportionate to the quantity-rate. By selecting the appropriate weight I am enabled to correct not only for the approximation, of the versed sine to the square root relationship, but also for the movement of the counter displacer 52 and bell 34 relative to the liquid surface. In the embodiment shown in Fig. 9, I provide the counter weight 50' for this purpose. In the embodiment shown in Fig. 10 instead of employing a counter weight I modify the shape of the spherical float 148 by providing the protuberance 35 thereon so shaped as to correct for this deviation in the square root versed sine relationship.

In the preferred embodiment shown in Figs. 1–5 I provide a counter displacer 52 preferably attached to the unity weight 22, this being mounted on the opposite side of said pulley 42 and shaft 20 from said bell 34 and being of a size so as to displace at the zero horizontal position of the beam 20 a volume equal to the submerged volume of the bell, the shape of the displacer 52 being cylindrical in accordance with the shape of the bell to displace equal volumes regardless of the height of the sealing fluid. The purpose of the displacer 52 is to prevent moderate changes in the density and height of the sealing liquid from upsetting the equilibrium of the shaft 20, more especially at the zero position.

Figure 1:
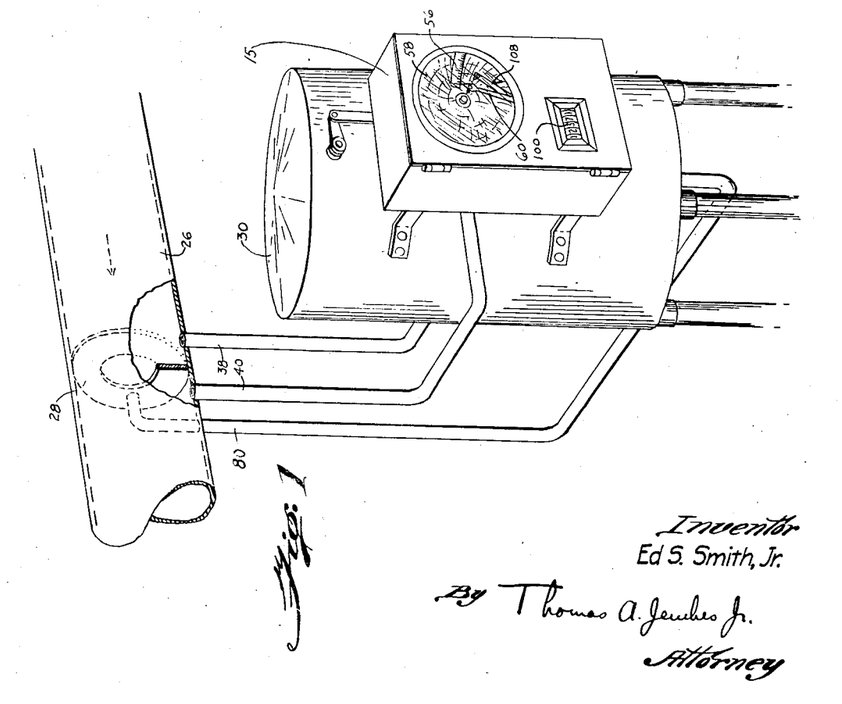
Fig. 1 is a perspective view of my improved specific type of meter attached to a conduit adapted to meter natural gas.
Figure 2:
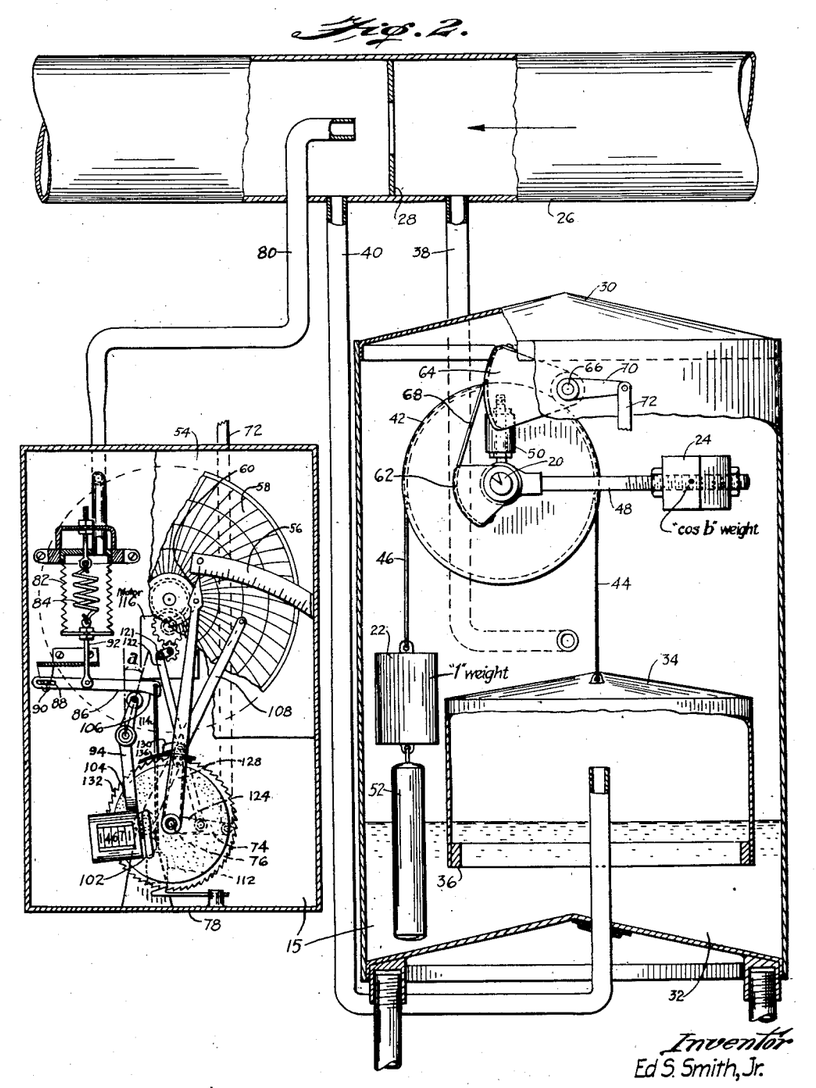
Figs. 2 and 3 are diagrammatic split sectional views of my improved metering device shown in Fig. 1 with the back of the pressure and integrating mechanism box diagrammatically removed and shown in section laterally of the bell pressure differential responsive means to more clearly show its structure, Fig. 2 showing the pressure differential responsive means in zero horizontal position and showing a mean pressure in the conduit and Fig. 3 showing the pressure differential responsive means, the pressure responsive means and the multiplying means all in maximum position.
Figure 3:
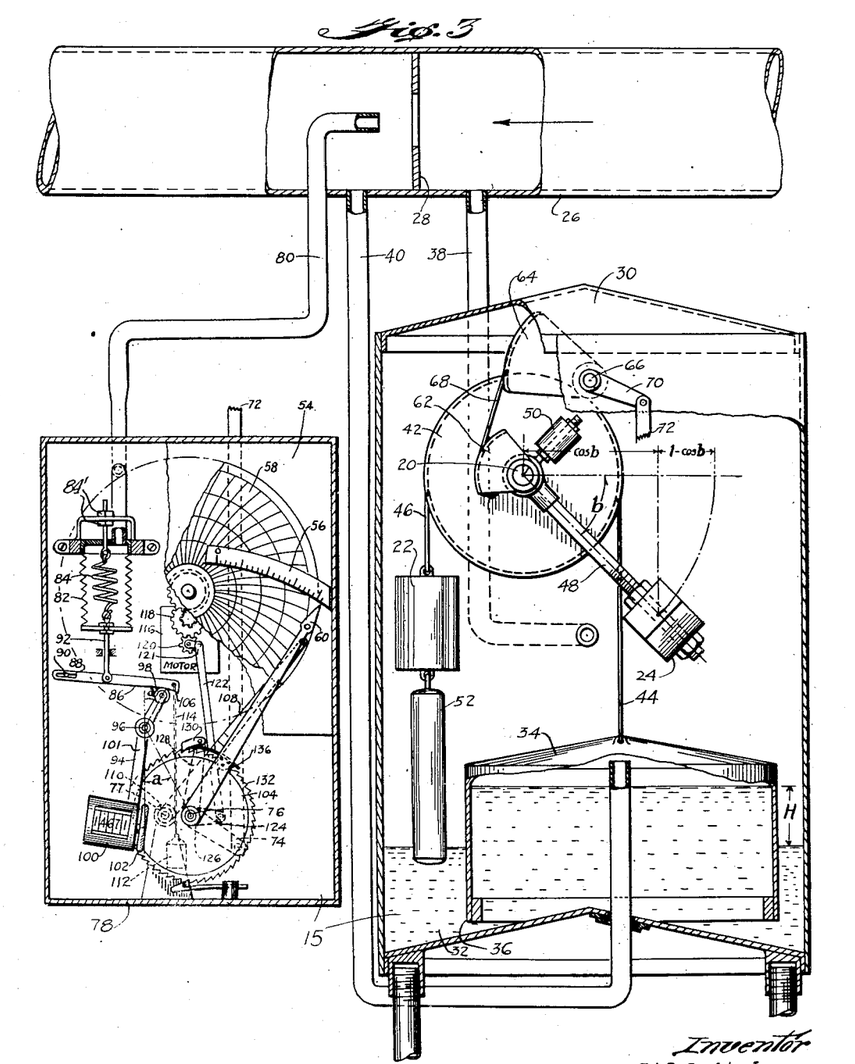
Figure 4:
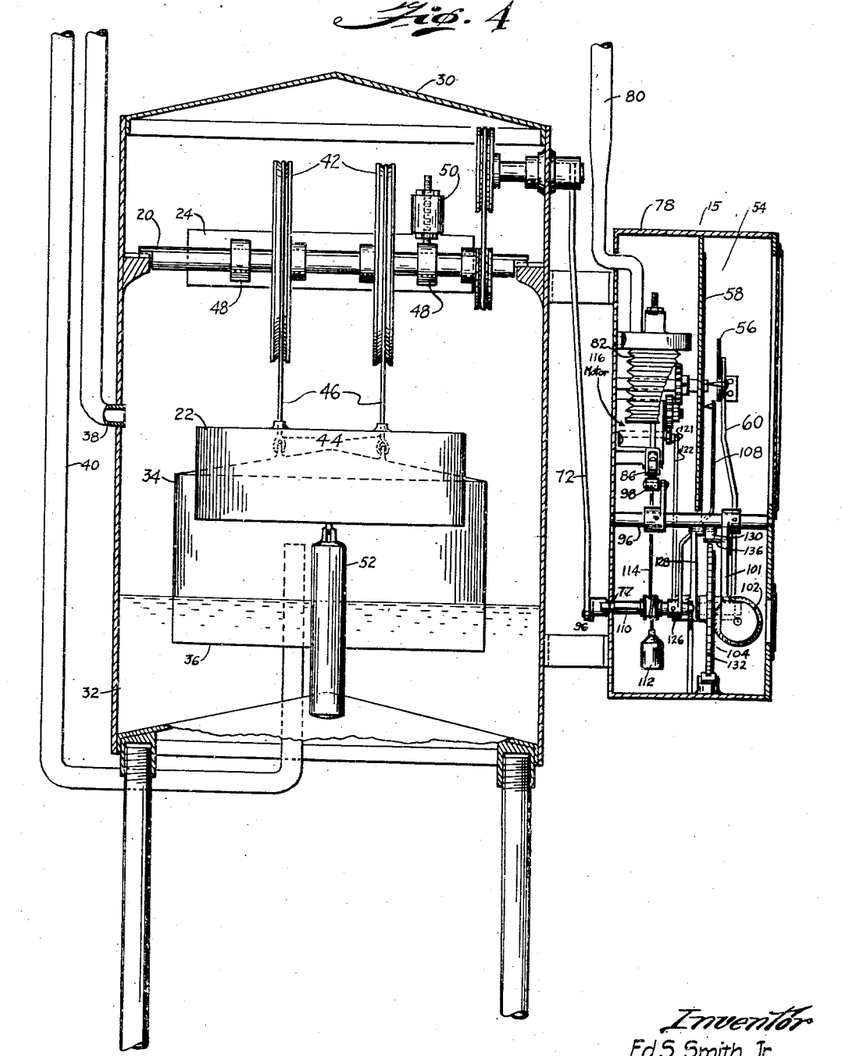
Fig. 4 is a cross sectional view taken through my improved meter.
Figure 5:
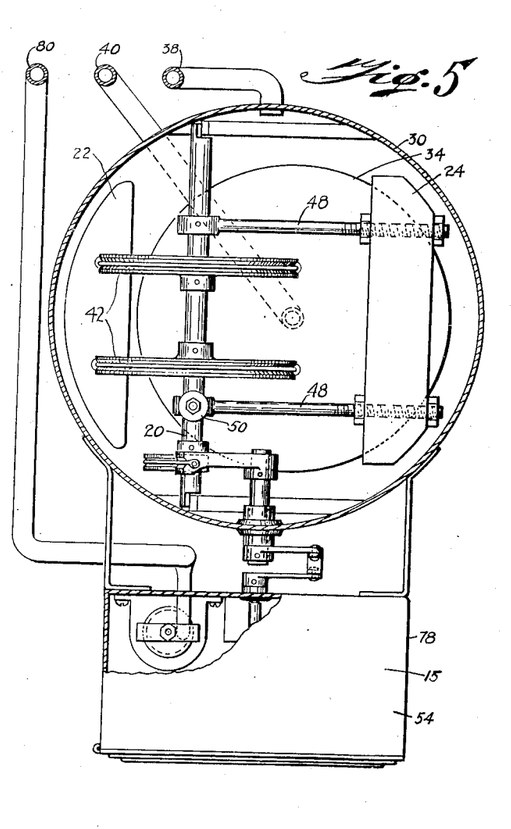
Fig. 5 is a plan view of my improved meter with the top of the bell casing removed and a portion of the pressure responsive integrating box also removed.

It is thus apparent that the beam 20 and the cooperating levers 48 will be moved from horizontal position as shown in Fig. 2 to the position shown in Fig. 3 an amount proportionate to the square root of the pressure differential or the versed sine of its angular displacement and thus the movement of the shaft 20 and lever 48 may directly indicate the quantity-rate of flow. In my preferred embodiment, however, I provide a suitable type of indicating means having a movable indicating part connected to said pivoted shaft 20 and as it is connected to said shaft 20 it is actuated by said pivoted shaft 20 to move in accordance with the square root of the pressure differential. While any suitable type of indicating means 54 having a movable indicating part 60 may be employed, in my preferred embodiment I provide both an indicating scale 56 and a rotating chart recorder 58 and move the arm 60 which preferably has a pen attached thereto to record on said chart and move relative to said scale. Said arm 60 is connected to said shaft 20 through the medium of the following connections: the sheave 62 mounted on said shaft 20, the sheave 64 mounted on a separate shaft 66 and connected to said sheave 62 by means of the strap 68, the crank arm 70 connected to said shaft 66, the link 72 connecting the crank arm 70 to a crank arm 74 mounted on a shaft 76 pivotally mounted transversely of the register casing 78, the arm 60 also being mounted on said shaft 76. As stated hitherto Figs. 2 and 3 are partially diagrammatic, insofar as the register casing 78 is diagrammatically cut off from the side of the casing 30 and opened up as a book, with the link 72 being broken, it being obvious that in use as shown in Figs. 1 and 4 the register casing 78 will be adjacent the front side of the casing 30.

As stated hitherto, I provide both a novel method of and apparatus for metering any type of a quantity and I have described hitherto in the preferred embodiment shown in Figs. 1–5 an embodiment of my invention adapted to meter the quantity-rate of flow through the medium of its relation to the square root of the pressure differential. I have also in my preferred embodiment shown a pressure meter adapted to directly meter the pressure in the conduit 26 and also provide multiplying means to continuously correct the quantity-rate for changes in pressure such as are apt to occur in ordinary gas metering. For this purpose I mount the pipe 80 in said conduit to receive the proper pressure therein and conduct it to a pressure responsive device. While any type of pressure responsive device may be employed, I preferably employ the extensible bellows 82 normally held in partially retracted position by the spring 84 attached to each respective end thereof, the bellows 82 being suitably mounted in the register casing 78 and the pipe 80 discharging therein. I also provide cam means 86 movable in proportion to the pressure in said conduit comprising the substantially straight cam 86 having a slot 88 in one end thereof in which the stationary pin 90 is adapted to register. Said cam 86 is connected to the lower end of the bellows 84 by means of the link 92 and it is thus obvious that due to the pin and slot connection the cam 86 will move in a true proportion to the absolute pressure, the pin 90 sliding in the slot 88 to permit a true vertical movement of said cam 86. I also provide pivoted means preferably also carrying quantity-rate indicating means moved by said cam means 86 through an angle $a$ the versed sine of which is substantially proportional to said pressure, whereby said pivoted means swings through an angle proportionate to the square root of said pressure. In my preferred embodiment said pivoted means comprises a lever 94 pivoted at 96 having a roller 98 on the upper actuating end thereof adapted to be contacted by the lower surface of said cam 86. The integrating means 100 is pivotally mounted on the lower arm 101 of said pivoted member 94 and has the actuating roller 102 projecting therefrom. The shaft 76 on which the indicating arm 60 is mounted has mounted thereon the rotatable disc 104. If the angle $a$ were zero the counter roller 102 would be at the substantial center of the disc 104 and shaft 76 so that there would be no movement of the integrating means. When angle $a$ is zero, the lower end of bellows 82 positions the practically straight cam 86 to form a right angle with the arm of lever 94 connecting roller 98 and pivot 96, the point of contact of cam 86 and roller 98 being aptly termed a point of reference. In case the bellows 82 should be mounted in a vacuum, the spring 84 and the adjusting screw means therefor would be set so that with the same (zero) pressure inside of bellows 82, the cam 86 would be positioned at this reference point, in which case the cam 86 would obviously be displaceable from this reference point an extent proportional to the absolute pressure inside of bellows 82. However, it is more practical to have the bellows 82 surrounded by atmospheric air at its practically constant base value of about 14.4 pounds per square inch absolute. In this case, the spring 84 is adjusted, as by nuts 84' for example, to space the cam 86 from the fixed reference point by an extent proportional to said reference base value when atmospheric pressure is also inside of bellows 82. With a varying line pressure, bellows 82 then moves cam 86 an extent corresponding to the gauge pressure of the gas inside of the bellows so that the displacement of cam 86 from the reference point corresponds with the absolute pressure of the gas inside of bellows 82 and the lever 94 consequently pivots through an angle $a$ corresponding with the square root of this absolute pressure. It is thus apparent that the integrating roller 102 moves radially outwards from the center of said disc 104 through an angle the versed sine of which is substantially proportionate to the pressure, whereby the angle $a$ indicates substantially the square root of said pressure.

I also modify the movement of the pivoted member 94 to cause the counter 100 to follow the true substantially square root relation of said pressure and thus be affected by the square root of said pressure. In my preferred embodiment I do this by shaping the lower surface 106 of said cam means 86 contacting the roller 98 to modify the movement of said pivoted member to cause it to follow the true substantially square root of the pressure.

I also provide means to indicate some function of the pressure actuated by said pressure responsive cam means. In my preferred embodiment I provide means to indicate the pressure directly on the chart 58, said means includes the indicating arm 108 rigidly attached to the sleeve 110 loosely mounted on the rod 77. The sleeve 110 is suitably rotated by the pressure responsive cam means 86 in my preferred embodiment by the cord 114 attached to the actuating end of the cam means 86 suitably wrapped around the sleeve 110 and having the counter-weight 112 depending therefrom to position the sleeve 110. It is thus obvious that when the cam means 86 is raised on drop of pressure that the cord will be raised to rotate the indicating arm 108 towards the center of the rotating chart 58 and that as the cam means 86 is lowered on increase of pressure, that the counter-weight 112 will operate to rotate the sleeve 110 to swing the indicating arm 108 radially outwards on the indicating chart 58.

I provide suitable means to multiply the movement of said pivoted member 20 which as already explained moves through an angle $b$ the versed sine of which is proportional to said differential whereby the angular position of said member may indicate substantially the square root of said differential which follows in the present instance the actual quantity-rate of flow, and the movement of the pivoted means 94 which as already explained is moved through an angle the versed sine of which is proportional to any quantity in this instance the pressure, whereby the angular position of said pivoted means 94 may indicate substantially the square root of said pressure, whereby the quantity-rate may be corrected for changes in pressure. While any suitable type of automatically multiplying means may be employed I use a means of a standard well known type. I employ a constant speed motor or clock 116 which operates gear train 118. The lower gear 120 on the gear train has a pin 121 mounted thereon which rotates the upper end of a link 122 which has its lower end attached to a crank arm 124 mounted on a sleeve 126 loosely mounted on the shaft 76 which has a crank arm 128 projecting upwardly therefrom on the upper end of which a pawl 130 is pivotally mounted. The disc 104 has the ratchet teeth 132 projecting radially outwardly from the edge thereof and the pawl 130 is adapted to register in said teeth to rotate the disc 104. It is thus obvious that the rotative movement of the upper end of the link 122 will transmit an oscillating movement through the medium of the crank arm 124 to the sleeve 126, crank arm 128 and pawl 130 to make the pawl dig in to the ratchet teeth to rotate the disc 104 in an intermittent manner at a substantially constant number of teeth per hour so long as the pawl 130 is in mesh with the ratchet teeth. It is obvious that the counter roller 102 will be driven by frictional contact with the side of the disc 104 to integrate. The multiplication therefore depends not only on the rate of rotation of the disc 104, but also on the radial position of the roller 102 thereon.

As already pointed out, since the radial position of the integrator roller 102 varies as the square root of the pressure, the rate of rotation of the disc 104 will be varied from a constant speed in a manner about to be explained. I mount the shield 136 projecting laterally from a side of the indicating arm 60 over the ratchet teeth 132 and adapted to be moved to a position between the pawl 130 and ratchet teeth 132 and it is obvious that when the shield 136 is in this position that the pawl will merely reciprocate over the top of the shield and that there will be no rotation of the disc 104. When, on increase of the pressure differential, the arm 60 is moved radially outwardly over the chart 58 it is obvious that the shield 136 will progressively cover up a lesser number of ratchet teeth 132 in the reciprocating path of the pawl 130 so that when the indicating arm 60 is in the maximum position shown in Fig. 3 the pawl 130 will swing over a reciprocating stroke of, say, forty teeth to rotate the disc 104 at its fastest rate, the number of teeth moved on each reciprocation of the pawl therefore varying from zero to forty depending on the position of the shield 136 which in turn varies in proportion to the quantity-rate of flow or square root of the pressure differential. It is thus obvious that the rotation of the roller 102 will thus automatically multiply the movement of the square root of the pressure differential by the movement of the square root of the pressure. While this may be done in any suitable manner through the movement of the respective pivoted member 20 and pivoted means 94 it is preferably done directly by the movement of the pivoted means 94 which carries the quantity-rate integrating means 100 and indirectly by the medium of the indicating arm 60 which in turn is moved in the manner hitherto explained by the pivoted member 20 and it is thus obvious that the integration will take place to show the quantity-rate modified for variations in pressure.

The operation of the embodiment of my invention shown in Figs. 1–5 is quite apparent from the previous description. On changes of rate of flow of fluid or gas through the conduit 26 the differential producing means 28 sets up a pressure differential H which is transmitted into movement of the bell 34 through the medium of the high and low pressure side connecting pipes 38 and 40 in the manner hitherto explained. The bell 34 through the medium of the cord 44 attached to the pulley 42 then exerts a torque on the beam or pivoted member 20 proportionate to said pressure differential H. The torque balancing means functions in the manner hitherto explained. The weight 22 exerts an opposing counter torque of unity to the force proportionate to said differential H exerted on said beam 20 by said bell 34 and the second weight 24 which is pivotally mounted on said beam 20 by means of the lever 48 exerts a reinforcing torque which varies as the cosine of the angle $b$, whereby the net balancing torque of the beam 20 is proportional to said variable when said beam is in equilibrium and the angle $b$ is continuously proportional to the square root of said variable due to the versed sine square root relationship hitherto described. Thus the bell 34 moves in accordance with the pressure differential H, the beam 20 swings in accordance with the square root of the pressure differential H or the versed sine relationship, namely, the unity torque one due to the weight 22 minus the cosine torque due to the pivoted weight 24. The movement of the beam 20 is transmitted in the manner heretofore described to the indicating arm 60 to indicate directly the quantity-rate of flow on the scale 56 and on the rotating recording chart 58 rotated by the motor 116. The shield 136 attached to said indicating arm 60 is moved over the ratchet 132 to bring the desired number of ratchet teeth in the reciprocating path of the pawl 130 to rotate the disc 104 in amounts substantially proportionate to the quantity-rate or square root of the differential H. The bellows 82 is extended in amounts proportionate to the pressure in the conduit 26 through the medium of the pipe 80, which bellows in turn reciprocates the cam means 86 in proportion to said pressure. The integrating roller 102 swings with the pivoted means 94 to substantially the center of the disc 104 and rod 76 to a zero position substantially at the center of the disc with zero absolute pressure and as the cam means 86 is depressed with increase of pressure, the roller 102 swings radially outward on the face of the disc 104 through an angle the versed sine of which is proportional to the pressure whereby the angular position of said pivoted member 94 and thus the radial position of said roller 102 on said disc 104 indicates substantially the square root of the pressure, the roller being moved in radial amounts outwards on the face of the disc 104 in proportion to the square root of the pressures. It is thus obvious that as the roller moves further radially outwards on the face of the disc 104 that it will be rotated faster as it has an increasingly large peripheral circumference to roll over for each movement of the pawl and ratchet. The lower surface of said cam means 86 as explained is shaped to modify the movement of the pivoted means 94 to cause this to follow the true substantially square root of said pressure. It is thus obvious that the rate of rotation of the roller 102 of the integrator 100 is in proportion to the product of the quantity rate or square root of the differential H times the square root of the pressure, thus modifying the quantity-rate in accordance with pressure. The counter-weight 50 as stated, is of such a size as to bring into synchronism the versed sine square root relationship so as to make the shaft 20 pivot in the true substantially square root relationship. The counter displacer 52 functions as explained to displace at the zero position a volume equal to the submerged volume of the bell, whereby moderate changes in the density and height of the sealing liquid do not upset the equilibrium of the beam or shaft 20. It is also apparent that the angle $b$ is formed in amount from the horizontal proportionate to the square root of the pressure differential H. It is also obvious that the angle $a$ is formed by pivoting the roller 102 radially outwards from the center of the disc 104.

It is also apparent that if desired the pressure modifying means for modifying the quantity-rate of flow may be dispensed with, which would permit a different type of integrator to be employed. It is also obvious that the pressure indicating means may be employed alone employing the versed sine principle to indicate directly the square root of the pressure. In the claims I employ the word "indicating" broadly to include indicating, recording or integrating. It is also apparent that my invention may be employed to continuously indicate the function of any quantity which is the true substantially square root relation, for any type of variable quantity employing the versed sine principle, or that this principle may be employed to secure the product of the functions of any two or more such variable quantities.

Figures 9, 10:
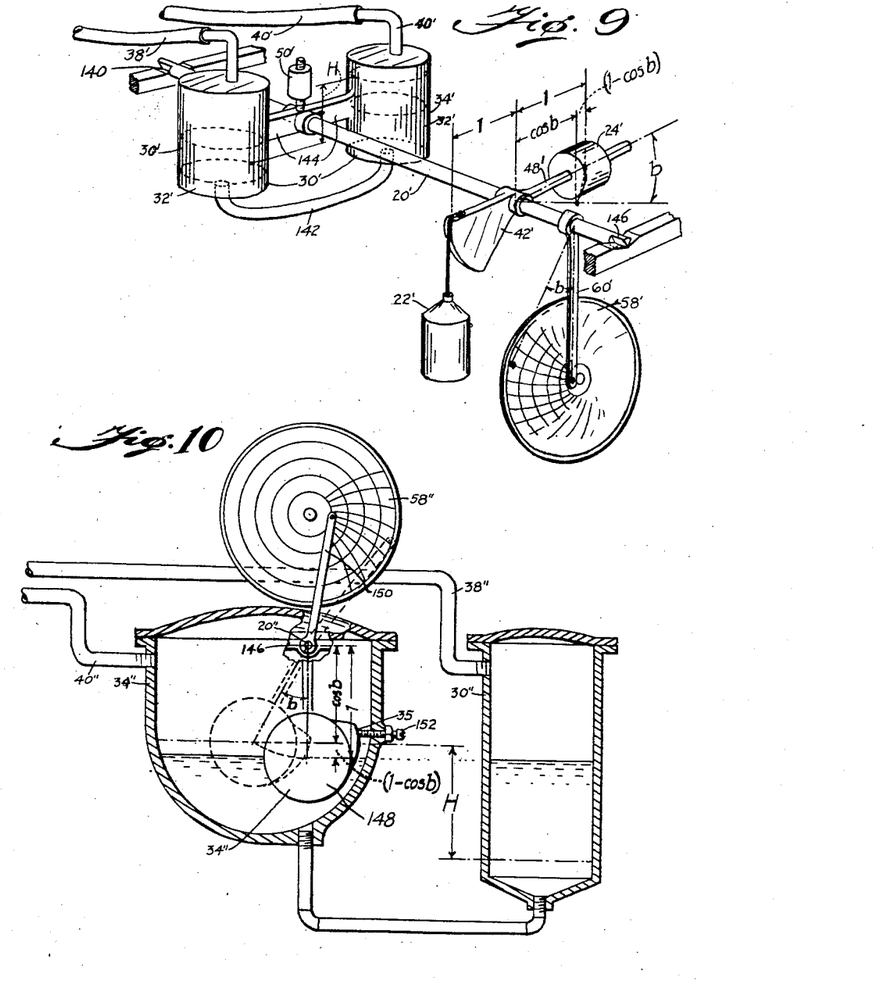
Fig. 9 is a diagrammatic perspective view of a different embodiment of my invention, also employing the versed sine principle employing counterbalancing weights as in my preferred embodiment.
Fig. 10 is a diagrammatic side elevation partially shown in section of a relatively simple embodiment of my invention not employing counterbalancing weights but also using the versed sine relation with distances instead of weights.

In Fig. 9 I have shown a slightly different embodiment of my invention. In this embodiment which is particularly adapted for use in metering liquids the pivoted shaft 20' is suitably pivoted on the knife edges 140. Said pivoted shaft has mounted horizontally on each side thereof the upstream bucket 30' and the down stream bucket 34' suitably connected together by medium of the pipe 142. The bucket 30' is suitably connected by means of the pipe 38' to the high pressure side of a differential producing means, and the bucket 34' is suitably connected by the pipe 40' to the low pressure side of the differential pressure producing means. It is therefore obvious that the weight of liquid 32' in said respective buckets 30' and 34' will vary in proportion to the differential H between the upstream and downstream pressures and that the shaft 20 will be tilted by the respective increase of weight in the bucket 34' through an angle b the versed sine of which is proportional to the pressure differential or difference in weight between the relative similar sized buckets 30' and 34', whereby the angular position of said shaft 20' may indicate substantially the square root of said quantity. In this case the shaft 20' has an arm 60' rigidly attached thereto to directly indicate on the rotating recording chart 58' the quantity-rate of flow in terms of the square root of the pressure differential H. The unity weight 22' is pivotally mounted on the pulley segment 42' so as to reciprocate with a constant force thereon whereas the cosine weight 24' is suitably pivoted on the lever 48' also joined to said shaft 20' and it is thus obvious that the beam 20' will be tilted an amount proportional to said variable and that the angle of tilting b will be continuously proportional to the square root of the pressure differential or quantity-rate. The compensating weight 50' to modify the movement of the pivoted member or shaft 20' to cause it to follow the true substantially square root relation of the pressure differential H to synchronize the relation between the versed sine and square root relationship is mounted intermediate of the arm 144 joining said buckets 30' and 34' to said beam 20'. It is thus apparent that beam 20' will tilt in accordance with changes in the square root of the pressure differential H to indicate directly on the recording chart the true quantity-rate of flow.

In Fig. 10 I have shown an extremely simple embodiment of my invention which is relatively easy to construct. This also makes use of what I believe is a novel principle in meters of this description. In this instance I employ a modified U-tube having one leg 30'' thereof connected by means of the pipe 38'' to the high pressure side of the pressure differential producing means and the other leg 34'' connected through the medium of the pipe 40'' to the downstream side of the pressure differential producing means. I have discovered that if a beam is tilted away from a vertical position at zero differential that its movement from that position will be in substantially the true versed sine relationship. For this purpose, I mount the beam 20'' on a substantially central pivot 146 in said downstream leg 34'' and I provide on the lower end of said beam the float 148. The upper end 150 of said beam carries a recording pen and is moved radially outwardly on the continuously rotating recording chart 58'' from a true substantially vertical position passing through the center of said recording chart. In the embodiment shown, however, the beam is shown slightly bent at its pivot point so that the zero position thereof will be enough away from the center of the recording chart to provide means to mount the recording chart on its rotating disc. It is thus obvious that on changes in the pressure differential the float 148 and also the beam 20'' to which the float is attached will be tilted angularly through an angle b the versed sine of which is proportional to the pressure differential H, whereby the angular position of said beam 20'' may indicate substantially the square root of said pressure differential H. As the lower end 148 of said beam is tilted outwardly it is also apparent that the pen on the upper end thereof will be moved radially outwardly on the recording chart 58''. As stated hitherto the versed sine square root relationship is not quite correct and I provide means to modify the movement of the pivoted member to cause it to follow the true substantially square root relation and thus indicate the quantity-rate. In this embodiment I do this in what I believe is a novel manner. In order that the float as it moves may displace the proper amount of liquid I provide the protuberance 35 on one side thereof so shaped as to synchronize the square root: versed sine relationship. In order to adjust the zero position of the beam I provide the adjustable set screw 152 adapted to abut the edge of the float 148 which also prevents the beam from being locked in a vertical position.

It is thus apparent that I have provided not only a novel apparatus for, but also a novel method of indicating a quantity or continuously multiplying a plurality of quantities employing directly in the apparatus or method itself the versed sine square root relationship which functions itself to give the desired function of the quantity without any outside mental calculation with the advantages hitherto portrayed.

It is obvious that the product of several variables forms a single variable whose square root may be taken by the same versed sine means that is shown for obtaining the square root of the single variables, differential and pressure.

It is understood that my invention is not limited to the specific embodiments shown or methods described and that various deviations may be made therefrom without departing from the spirit and scope of the appended claims.

What I claim is:

1. In a meter for continuously indicating the product of the square roots of several quantities, pivoted members, means to move each of said pivoted members through angles the versed sines of which are proportional respectively to said quantities whereby the angular position of said pivoted members may indicate substantially the square roots of said respective quantities, means coacting with said pivoted members to modify the movement of each of the respective pivoted members to cause them to follow the true substantially square root relation of said quantities, multiplying means actuated by said pivoted members to automatically multiply the square roots of said respective quantities and indicating means actuated by said multiplying means.

2. In a meter for continuously indicating the product of the square roots of several quantities, pivoted members, means to move each of said pivoted members through angles the versed sines of which are proportional respectively to said quantities whereby the angular position of said pivoted members may indicate substantially the square roots of said respective quantities, multiplying means actuated by said pivoted members to multiply the square roots of said respective quantities and indicating means actuated by said multiplying means.

3. In a quantity-rate meter adapted to be attached to a conduit to meter the quantity-rate of flow of fluid therethrough, means to produce a pressure differential responsive to the quantity-rate of flow, a pivoted member, means actuated by said pressure differential to move said pivoted member through an angle the versed sine of which is proportional to said differential whereby the angular position of said pivoted member may indicate substantially the square root of said pressure differential, a second pivoted member, means actuated by the pressure in said conduit to move said second pivoted member in response to variations in pressure in said conduit through an angle the versed sine of which is proportional to said pressure whereby the angular position of said second pivoted member may indicate substantially the square root of said pressure, means to modify the movement of each of said respective members to cause them to follow the true substantially square root relation of said pressure differential and pressure, means actuated by the pivoted members to multiply the square root of said pressure differential and the square root of said pressure and quantity-rate indicating means actuated by said multiplying means.

4. In a quantity rate meter adapted to be attached to a conduit to meter the quantity-rate of flow of fluid therethrough, means to produce a pressure differential responsive to the quantity-rate of flow, a pivoted member, means actuated by said pressure differential to move pivoted member through an angle the versed sine of which is proportional to said differential whereby the angular position of said pivoted member may indicate substantially the square root of said pressure differential, a second pivoted member, means actuated by the pressure in said conduit to move said second pivoted member in response to variations in pressure in said conduit through an angle the versed sine of which is proportional to said pressure whereby the angular position of said second pivoted member may indicate substantially the square root of said pressure, means actuated by the pivoted members to multiply the square root of said pressure differential and the square root of said pressure and quantity-rate indicating means actuated by said multiplying means.

5. In a quantity-rate meter adapted to be attached to a conduit to meter the quantity-rate of flow of fluid therethrough, means to produce a pressure differential responsive to the quantity-rate of flow, a casing having liquid therein, a floating bell in said casing sealed by said liquid, means connected respectively to the high and low pressure sides of said pressure differential producing means, one of said means being connected to said casing above the level of liquid therein and the other of said means being connected to the interior of said floating bell above the level of liquid therein, whereby the forces on said bell may vary in response said pressure differential, a shaft pivotally mounted in said casing, a pulley mounted on said shaft, means connecting said bell and pulley to cause said pulley and shaft to revolve in response to changes in said pressure differential, a weight, means to attach said weight to said pulley on the opposite side from said bell exerting a torque of unity on said shaft, a lever also mounted on said shaft having a weight attached thereto on the opposite side of said pulley from said unity weight, the torque exerted thereby when said lever is in a horizontal position being equal to unity and equal to the cosine of the angle formed by displacement of the lever from the horizontal so that the effective torque due to said weights is equal to unity minus the cosine of said angle, a counter displacer, means to attach said counter-displacer to the opposite side of said pulley from said bell so as to displace at the zero position a volume equal to the submerged volume of the bell, whereby moderate changes of the density and height of the sealing liquid do not upset the equilibrium of the shaft, a compensating weight mounted on said shaft of a magnitude to make the angular movement of said lever proportionate to the quantity-rate correcting not only for the approximation of the versed sine to the square root relationship but also for the movement of the counter displacer and bell relative to the liquid surface, indicating means having a movable indicating part connected to and actuated by said pivoted shaft to move in accordance with changes in the square root of the pressure differential, cam means, means to move said cam means in proportion to the pressure in said conduit, pivoted means carrying quantity-rate indicating means connected to and moved by said cam through an angle the versed sine of which is substantially proportional to said pressure, whereby said pivoted means swings through an angle proportional to the square root of said pressure, means indicating some function of the pressure actuated by said pressure responsive cam means, means to automatically multiply the movement of the said square root of the pressure differential indicating means by the movement of the square root of the pressure indicating means, whereby the said quantity-rate indicating means may indicate the product of said square root of the pressure differential by the square root of the pressure in terms of quantity-rate, the surface of said cam means contacting said pivoted means being shaped to modify the movement of said pivoted means to cause it to follow the true substantially square root of said pressure.

6. In a quantity-rate meter adapted to be attached to a conduit to meter the quantity-rate of flow of fluid therethrough, means to produce a pressure differential responsive to the quantity-rate of flow, a shaft, a pulley mounted on said shaft, means operatively connecting said pressure differential producing means and pulley to cause said pulley and shaft to revolve in response to changes in said pressure differential, a weight attached to said pulley on the opposite side from said pressure differential producing means exerting a torque of unity on said shaft, a lever also mounted on said shaft having a weight attached thereto on the opposite side of said pulley from said unity weight, the torque exerted thereby when said lever is in a horizontal position being equal to unity and equal to the cosine of the angle formed by pivoted movement of the lever from the horizontal so that the effective torque due to said weights is equal to unity minus the cosine of said angle, cam means, means to move said cam means in proportion to the pressure in said conduit, pivoted means carrying quantity-rate indicating means moved by said cam through an angle the versed sine of which is substantially proportional to said pressure, whereby said pivoted means swings through an angle proportional to the square root of said pressure, means to automatically multiply the movement of said pressure differential controlled pivotable shaft and said pressure controlled pivotal means, whereby the said quantity-rate indicating means may indicate the product of said square root of the pressure differential by the square root of the pressure in terms of quantity-rate.

7. In a quantity-rate meter adapted to be attached to a conduit to meter the quantity-rate of flow of fluid therethrough, means to produce a pressure differential responsive to the quantity-rate of flow, a casing having liquid therein, a floating bell in said casing sealed by said liquid, means connected respectively to the high and low pressure sides of said pressure differential producing means, one of said means being connected to said casing above the level of liquid therein and the other of said means being connected to the interior of said floating bell above the level of liquid therein, whereby the forces on said bell may vary in response to said pressure differential, a shaft pivotally mounted in said casing, a pulley mounted on said shaft, means connecting said bell and pulley to cause said pulley and shaft to revolve in response to changes in said pressure differential, a weight, means attaching said weight to said pulley on the opposite side from said bell and exerting a torque of unity on said shaft, a lever also mounted on said shaft having a weight attached thereto on the opposite side of said pulley from said unity weight, the torque exerted thereby when said lever is in a horizontal position being equal to unity and equal to the cosine of the angle formed by displacement of the lever from the horizontal so that the effective torque due to said weights is equal to unity minus the cosine of said angle, a counter displacer, means attaching said displacer to the opposite side of said pulley from said bell so as to displace at the zero position a volume equal to the submerged volume of the bell, whereby moderate changes of the density and height of the sealing liquid do not upset the equilibrium of the shaft, a compensating weight mounted on said shaft of a magnitude to make the angular movement of said lever proportionate to the quantity-rate correcting not only for the approximation of the versed sine to the square root relationship but also for the movement of the counter displacer and bell relative to the liquid surface, and indicating means having a movable indicating part connected to and actuated by said pivoted shaft to move in accordance with changes in the square root of the pressure differential.

8. In a quantity-rate meter adapted to be attached to a conduit to meter the quantity-rate of flow of fluid therethrough, means to produce a pressure differential responsive to the quantity-rate of flow, a pivotally mounted shaft, a pulley mounted on said shaft, means operatively connecting said pressure differential producing means, including a bell partially submerged in a sealing liquid, and pulley to cause said pulley and shaft to revolve in response to changes in said pressure differential, a weight attached to said pulley on the opposite side from said pressure differential producing means exerting a torque of unity on said shaft, a lever also mounted on said shaft having a weight attached thereto on the opposite side of said pulley from said unity weight, the torque exerted thereby when said lever is in a horizontal position being equal to unity and equal to the cosine of the angle formed by displacement of the lever from the horizontal so that the effective torque due to said weights is equal to unity minus the cosine of said angle and a counter displacer, means connecting said displacer to the opposite side of said pulley from said bell so as to displace at the zero position a volume equal to the submerged volume of the bell, whereby moderate changes of the density and height of the sealing liquid do not upset the equilibrium of the shaft.

9. In a quantity-rate meter adapted to be attached to a conduit to meter the quantity-rate of flow of fluid therethrough, means to produce a pressure differential responsive to the quantity-rate of flow, a pivotally mounted shaft, a pulley mounted on said shaft, means operatively connecting said pressure differential producing means and pulley to cause said pulley and shaft to revolve in response to changes in said pressure differential, a weight attached to said pulley on the opposite side from said pressure differential producing means exerting a torque of unity on said shaft, a lever also mounted on said shaft having a weight attached thereto on the opposite side of said pulley from said unity weight, the torque exerted thereby when said lever is in a horizontal position being equal to unity and equal to the cosine of the angle formed by displacement of the lever from the horizontal so that the effective torque due to said weights is equal to unity minus the cosine of said angle, a counter displacer, means connecting said displacer with the opposite side of said pulley from the pressure differential producing means, and a compensating weight mounted on said shaft of a magnitude to make the angular movement of said lever proportionate to the quantity-rate correcting not only for the approximation of the versed sine to the square root relationship but also for the movement of the counter displacer and bell relative to the liquid surface.

10. In a pressure-responsive meter, cam means, means to move said cam means in proportion to the pressure, pivoted means moved by said cam means through an angle the versed sine of which is substantially proportional to said pressure whereby said pivoted means swings through an angle substantially proportional to the square root of said pressure and means indicating some function of the pressure actuated by said pressure responsive cam means, the surface of said cam means contacting said pivoted means being shaped to modify the movement of said pivoted means to cause it to follow the true substantially square root of said pressure.

11. In a pressure-responsive meter, cam means movable in porportion to the pressure, pivoted means moved by said cam means through an angle the versed sine of which is substantially proportional to said pressure whereby said pivoted means swings through an angle proportional to the square root of said pressure, the surface of said cam means contacting said pivoted means being shaped to modify the movement of said pivoted means to cause it to follow the true substantially square root of said pressure.

12. In a device for indicating the square root of the product of several variables, in combination, means comprising members individually responsive to functions of said variables, means acted upon by said means to indicate a function of said functions and means to cause both of said means to respond proportionately to the versed sine of its respective function whereby said device may indicate the square root of the product of said variables due to the versed sine: square root relationship.

13. In a pressure responsive meter, pressure responsive means movable in proportion to the pressure, pivoted means slidingly contactingly actuated by said pressure responsive means through an angle the versed sine of which is substantially proportional to the movement of said pressure responsive means, the contacting portion of said pressure responsive means being so shaped to coact with the contacting portion of said pivoted means to modify the movement of said pivoted means to cause it to substantially follow the true square root of said pressure.

14. In a flow meter, pressure differential means responsive to the uncorrected rate of flow, an integrator counter, an integrator member controlled by said pressure differential responsive means to be driven at an average speed proportional to the uncorrected rate of flow, a second integrator member whose position controls the average speed of the integrator counter, said integrator counter being actuated by said first and second integrator members, movable means displaceable in proportion to a second variable affecting the flow, a pivoted member actuated by said movable means to swing through an angle whose versed sine is substantially proportional to the displacement of said movable means so that this angle is substantially proportional to the square root of said second variable, said second integrator member being so connected to said pivoted member as to be positioned by said pivoted member so as to correct the speed of said integrator counter for said second variable that said counter may integrate the true flow quantity.

15. In a rate of flow meter adapted to be attached to a conduit to meter the rate of flow of fluid therethrough, means to produce a pressure differential proportional to the square of the uncorrected rate of flow, uncorrected rate metering means actuated by said pressure differential having a portion displaceable proportional to the square root of said pressure differential, a rotatable disk having ratchet teeth on the edge thereof, a pawl for said ratchet teeth intermittently driven forward cyclically at regular intervals, an arm having an end pivotally mounted on said disk center and actuated by said uncorrected rate metering means portion, said arm having a shield mounted thereon interposable between said pawl and ratchet teeth and adapted to be withdrawn an extent that is a portion of each pawl forward movement proportionate to said uncorrected rate; a pivoted member, means actuated by a second variable affecting the flow to move said pivoted member in response to variations of said second variable in said conduit through an angle the versed sine of which is substantially proportional to said other variable, whereby the angular position is such that the pivoted member follows substantially the square root of said other variable, a counter and roller mounted on said pivoted member, said roller being in contact with and movable radially on said disk in proportion to variations in said other variable, whereby said integrator may integrate the product of the square root of the pressure differential and the square root of the other variable.

16. In a rate of flow meter adapted to be attached to a conduit to meter the rate of flow of fluid therethrough, means to produce a pressure differential proportional to the square of the uncorrected rate of flow, metering means actuated by said pressure differential including a disk movable at an average speed proportional to the square root of said pressure differential, a pivoted member, means actuated by a second variable affecting the flow to move said pivoted member in response to variations of said variable in said conduit through an angle the versed sine of which is substantially proportional to said other variable, whereby the angular position is such that the pivoted member follows substantially the square root of said other variable, a counter and roller mounted on the opposite end of said pivoted member, said roller being in contact therewith and movable radially outwards on said disk in proportion to variations in said other variable, whereby said integrator may integrate the product of the square root of the pressure differential and the square root of the other variable.

17. In a meter for obtaining the square root of an absolute pressure from its corresponding gauge pressure relative to atmospheric presure, gauge pressure responsive means having a part displaceable from a fixed reference point an extent substantially proportional to said absolute pressure, means for adjustably spacing said displaceable part from said fixed reference point to an extent proportional to said atmospheric pressure, and pivoted means actuated by said displaceable part of said pressure responsive means through an angle the versed sine of which is substantially proportional to said absolute pressure, whereby said pivoted means' angle is substantially proportional to the square root of said absolute pressure.

18. In a meter for obtaining the square root of an absolute quantity from its corresponding value relative to a reference base value, means responding to said relative value and having a part displaceable from an initial position for an extent proportional to said relative value, means for adjustably spacing said initial position from a fixed reference point by an extent proportional to said reference base value, and pivoted means actuated by said relative value responsive means through an angle the versed sine of which is substantially proportional to the algebraic sum of said extents, whereby said pivoted means' angle is substantially proportional to the square root of said absolute quantity.

19. In a flow meter having an integrator the average speed of which is to be corrected for the square root of an absolute pressure from its corresponding gauge pressure relative to atmospheric pressure; an integrator comprising means movable at an average speed proportional to an uncorrected flow rate, counter means having means movable at an average speed corrected for the square root of said absolute pressure, and means responsive to said gauge pressure coacting with said uncorrected movable means and having a portion adapted to correctingly modify the average speed of said counter movable means; said pressure responsive means comprising means displaceable by said gauge pressure from a reference point for an extent substantially proportional to said absolute pressure, and pivoted means positioned by said displaceable means through an angle the versed sine of which is substantially proportional to said displacement of said gauge pressure responsive means, said pivoted means positioning said portion for correcting said counter movable means' average speed.

ED S. SMITH, Jr.